(12) United States Patent
Budalakoti

(10) Patent No.: US 11,537,594 B2
(45) Date of Patent: Dec. 27, 2022

(54) APPROXIMATE ESTIMATION OF NUMBER OF DISTINCT KEYS IN A MULTISET USING A SAMPLE

(71) Applicant: Oracle International Corporation, Redwood Shores, CA (US)

(72) Inventor: Suratna Budalakoti, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/168,459

(22) Filed: Feb. 5, 2021

(65) Prior Publication Data
US 2022/0253425 A1    Aug. 11, 2022

(51) Int. Cl.
| | | |
|---|---|---|
| G06F 16/23 | (2019.01) | |
| G06F 16/22 | (2019.01) | |
| G06F 16/2455 | (2019.01) | |
| G06F 17/18 | (2006.01) | |

(52) U.S. Cl.
CPC ........ G06F 16/2365 (2019.01); G06F 16/221 (2019.01); G06F 16/2282 (2019.01); G06F 16/24558 (2019.01); G06F 17/18 (2013.01)

(58) Field of Classification Search
None
See application file for complete search history.

(56) References Cited

U.S. PATENT DOCUMENTS

| | | | |
|---|---|---|---|
| 6,226,629 B1 * | 5/2001 | Cossock | ............ G06F 16/9014 |
| 6,477,523 B1 | 11/2002 | Chiang | |
| 6,493,637 B1 | 12/2002 | Steeg | |
| 7,213,012 B2 | 5/2007 | Jakobsson | |
| 7,376,639 B2 | 5/2008 | Kutsch | |
| 7,478,083 B2 | 1/2009 | Corvinelli | |
| 7,636,731 B2 | 12/2009 | Cruanes | |

(Continued)

FOREIGN PATENT DOCUMENTS

WO    WO 2018/222580    12/2018

OTHER PUBLICATIONS

U.S. Appl. No. 12/181,994, filed Jul. 29, 2008, Office Action, dated Oct. 3, 2016.

(Continued)

*Primary Examiner* — Kim T Nguyen
(74) *Attorney, Agent, or Firm* — Hickman Becker Bingham Ledesma LLP; Brian N. Miller

(57) ABSTRACT

Herein are quantitative analytics to increase the accuracy of cardinality estimation without increasing sample size. In an embodiment, a computer selects a few sample values from a multiset. A high-frequency exact count of distinct values that have at least a threshold amount of occurrences in the sample values is counted. A low-frequency exact count of distinct values in the sample that do not have at least the threshold amount of occurrences in the sample is counted. Based on multiple binomial probabilities, an upper bound of a count of missing distinct values in the multiset that are not in the sample is calculated. A total count of distinct values (NDV) in the multiset is estimated based on: a) the high-frequency exact count of distinct values, b) the low-frequency exact count of distinct values, and c) the upper bound of the count of missing distinct values in the multiset that are not in the sample.

20 Claims, 11 Drawing Sheets

COMPUTER 100

ALL VALUES 110
| B | A | B | B | C | A | A | A | A | B | B | A | D | B | E | B | E | B | A | B | A | B | A | B | A |
|---|---|---|---|---|---|---|---|---|---|---|---|---|---|---|---|---|---|---|---|---|---|---|---|---|

SAMPLE 120

ORIGINAL STATISTICS 130

| DISTINCT VALUE | POPULATION | ACTUAL SAMPLE | EXPECTED SAMPLE | ERROR | APPARENT FREQUENCY | EXPECTED FREQUENCY |
|---|---|---|---|---|---|---|
| A | 10 | 5 | 10 x 9 / 25 = 4 | OVERSAMPLED | HIGH | HIGH |
| B | 11 | 2 | 11 x 9 / 25 = 4 | UNDER-SAMPLED | LOW | HIGH |
| C | 1 | 1 | 1 x 9 / 25 = 0 | OVERSAMPLED | LOW | MISSING |
| D | 1 | 1 | 1 x 9 / 25 = 0 | OVERSAMPLED | LOW | MISSING |
| E | 2 | 0 | 2 x 9 / 25 = 1 | UNDER-SAMPLED | MISSING | LOW |

| COUNTS 140 | |
|---|---|
| OBSERVED HIGH-FREQUENCY 151 | A = 1 |
| OBSERVED LOW-FREQUENCY 152 | B, C, D = 3 |
| UPPER BOUND ON MISSING DISTINCT VALUES 153 | E = 1 |
| DISTINCT VALUES 154 | A, B, C, D, E = 5 |
| UNDER-SAMPLED HIGH-FREQUENCY 155 | B = 1 |
| OVERSAMPLED LOW-FREQUENCY 156 | C, D = 2 |

(56) References Cited

U.S. PATENT DOCUMENTS

| | | |
|---|---|---|
| 7,647,293 B2 | 1/2010 | Brown et al. |
| 7,959,113 B2 | 6/2011 | Fan et al. |
| 8,027,832 B2* | 9/2011 | Ramsey ............... G06F 40/263 |
| | | 382/229 |
| 8,290,931 B2 | 10/2012 | Hong |
| 10,055,506 B2 | 8/2018 | Rhodes |
| 10,474,652 B2 | 11/2019 | Baskett |
| 10,534,775 B2 | 1/2020 | Moerkotte et al. |
| 10,635,671 B2 | 4/2020 | Sheng et al. |
| 10,853,362 B2 | 12/2020 | Qin et al. |
| 10,983,976 B2 | 4/2021 | Qin |
| 11,074,534 B2* | 7/2021 | Piccicuto ................. C12Q 1/04 |
| 11,256,698 B2 | 2/2022 | Idicula et al. |
| 11,303,545 B2 | 4/2022 | Kumar et al. |
| 2002/0194157 A1 | 12/2002 | Zait |
| 2003/0084025 A1 | 5/2003 | Zuzarte |
| 2003/0135485 A1 | 7/2003 | Leslie |
| 2004/0122646 A1 | 6/2004 | Colossi |
| 2004/0139061 A1 | 7/2004 | Colossi |
| 2004/0215626 A1 | 10/2004 | Colossi |
| 2004/0225639 A1 | 11/2004 | Jakobsson |
| 2004/0225673 A1 | 11/2004 | Beck |
| 2005/0080803 A1 | 4/2005 | Sauermann |
| 2005/0102325 A1 | 5/2005 | Gould et al. |
| 2005/0251511 A1 | 11/2005 | Shankar |
| 2005/0278355 A1 | 12/2005 | Gonzalez |
| 2008/0086444 A1 | 4/2008 | Yu et al. |
| 2008/0133454 A1 | 6/2008 | Markl et al. |
| 2008/0306903 A1 | 12/2008 | Larson et al. |
| 2009/0006380 A1* | 1/2009 | Agrawal ............... G06F 16/217 |
| | | 707/999.005 |
| 2009/0006431 A1* | 1/2009 | Agrawal ............... G06F 16/217 |
| 2009/0281985 A1 | 11/2009 | Aggarwal |
| 2011/0153623 A1 | 6/2011 | Vo |
| 2012/0310874 A1 | 12/2012 | Dantressangle et al. |
| 2013/0060780 A1 | 3/2013 | Lahiri |
| 2014/0229482 A1 | 8/2014 | Milenova et al. |
| 2015/0278268 A1 | 10/2015 | El-Ali |
| 2016/0147804 A1 | 5/2016 | Wein |
| 2017/0109406 A1 | 4/2017 | Chavan |
| 2018/0150494 A1 | 5/2018 | Schulze |
| 2018/0341678 A1 | 11/2018 | Moerkotte et al. |
| 2019/0102427 A1* | 4/2019 | Chakkappen ..... G06F 16/24532 |
| 2019/0155930 A1 | 5/2019 | Fender et al. |
| 2019/0236474 A1* | 8/2019 | Smith ................. G06F 16/1724 |
| 2019/0251194 A1 | 8/2019 | Fender et al. |
| 2019/0256924 A1* | 8/2019 | Vogelstein ........... C12Q 1/6858 |
| 2020/0340064 A1* | 10/2020 | Gross ...................... G16C 10/00 |
| 2020/0377956 A1* | 12/2020 | Vogelstein ............. C12Q 1/686 |
| 2021/0365805 A1 | 11/2021 | Karnagel et al. |
| 2022/0091130 A1* | 3/2022 | Marcotte ............ G01N 33/6824 |

OTHER PUBLICATIONS

Chakkappen, U.S. Appl. No. 12/181,994, filed Jul. 29, 2008, Final Office Action, dated Feb. 13, 2018.

Chakkappen, U.S. Appl. No. 12/181,994, filed Jul. 29, 2008, Interview Summary, dated Apr. 16, 2018.

Chakkappen, U.S. Appl. No. 12/181,994, filed Jul. 29, 2008, Office Action, dated Feb. 3, 2017.

Chakkappen, U.S. Appl. No. 12/181,994, filed Jul. 29, 2008, Office Action, dated Sep. 5, 2017.

Fender, U.S. Appl. No. 16/155,740, filed Oct. 9, 2018, Final Office Action, dated Jan. 12, 2021.

Fender, U.S. Appl. No. 16/155,740, filed Oct. 9, 2018, Office Action, dated Jul. 24, 2020.

Su, U.S. Appl. No. 14/818,663, filed Aug. 5, 2015, Notice of Allowance, dated Aug. 2, 2017.

Chakkappen, U.S. Appl. No. 12/181,994, filed Jul. 29, 2008, Adviosry Action, dated Dec. 20, 2017.

U.S. Appl. No. 12/181,994, filed Jul. 29, 2008, Decision on Appeal, Jun. 29, 2016.

U.S. Appl. No. 12/181,994, filed Jul. 29, 2008, Office Action, dated Jun. 3, 2013.

U.S. Appl. No. 12/181,994, filed Jul. 29, 2008, Interview Summary, dated Apr. 5, 2017.

U.S. Appl. No. 13/764,658, filed Feb. 11, 2013, Final Office Action, dated Jan. 22, 2015.

U.S. Appl. No. 13/764,658, filed Feb. 11, 2013, Interview Summary, dated Apr. 1, 2015.

U.S. Appl. No. 13/764,658, filed Feb. 11, 2013, Notice of Allowance, dated May 22, 2015.

U.S. Appl. No. 13/764,658, filed Feb. 11, 2013, Interview Summary, dated Mar. 18, 2015.

U.S. Appl. No. 13/764,658, filed Feb. 11, 2013, Advisory Action, dated Apr. 15, 2015.

U.S. Appl. No. 12/181,994, filed Jul. 29, 2008, Examiners Answers, dated Nov. 20, 2013.

U.S. Appl. No. 11/764,658, filed Feb. 11, 2013, Office Action, dated Aug. 26, 2014.

Wikipedia, "Bloom Filter", https://en.wikipedia.org/wiki/Bloom_filter, edited Jul. 5, 2021, 23pgs.

Raab, M., et al., "Balls into Bins—A Simple and Tight Analysis", In: Randomization and Approximation Techniques in Computer Science. RANDOM '98, LNICS, vol. 1518. Springer, (https://doi.org/10.1007/3-540-49543-6_13) 1998, 12pgs.

O'Neill, Ben, "The Classical Occupancy Distribution: Computation and Approximation", The American Statistician, https://doi.org/10.1080/00031305.2019.1699445, Dec. 19, 2019, 13pgs.

Mitzenmacher, M., et al., "The Power of Two Random Choices: A Survey of Techniques and Results", In Handbook of Randomized Computing, 2001, pp. 255-312, 60pgs.

Chakkappen, et al, "Efficient and Scalable Statistics Gathering for Large Databases in Oracle 11g", Proceedings of the 2008 ACM SIGMOD international conference on Management of data, Jun. 2008, 11pgs.

Burnham, K. P. et al., "Es-timation of the Size of a Closed Population when Capture Probabilities Vary Among Animals", Biometrika 65, vol. 65, Issue 3, Dec. 1978, pp. 625-633.

Azar, Yossi, et al., "Balanced Allocations", Proc. of 26th STOC (1994), 593-602, 180-200, https://www.cs.tau.ac.il/~azar/box.pdf, 30pgs.

Haas et al., "Sampling-Based Estimation of the Number of Distinct Values of an Attribute", Proceedings of the 21st VLDB Conference, dated 1995, 12 pages.

Agrawal et al., "A Many-core Architecture for In-Memory Data Processing", MICRO-50, Oct. 14-18, 2017, Cambridge, MA, USA, 14 pages.

Ahmed et al., "Automated Generation of Materialized Views in Oracle", Proceedings of the VLDB Endowment, vol. 13, No. 12, dated Aug. 2020, 13 pages.

Balkesen et al., "RAPID: In-Memory Analytical Query Processing Engine with Extreme Performance perWatt", SIGMOD'18, Jun. 10-15, 2018, Houston, TX, USA, 13 pages.

Charikar et al., "Towards Estimation Error Guarantees for Distinct Values", dated 2000, 12 pages.

Cimiano, Philipp, "Chapter 6: Concept Hierarchy Induction", Ontology Learning and Population from Text: Algorithms. Evaluation and Applications, Springer, dated 2006, pp. 85-184.

Durand et al., "Loglog Counting of Large Cardinalities (Extended Abstract)", G. Di Battista and U. Zwick (Eds.): ESA 2003, LNCS 2832, pp. 605-617, 2003, 13 pages.

Fan, Wenfei, et al., "Discovering Conditional Functional Dependencies", IEEE Transactions on Knowledge and Data Engineering, vol. 23, No. 5, dated May 2011, pp. 683-698.

Agarwal, Nipun, "MySQL Analytics Service", Oracle Labs, dated 2019, 22 pages.

Flajolet et al., "HyperLogLog: the analysis of a near-optimal cardinality estimation algorithm", dated 2007 Conference on Analysis of Algorithms, 22 pages.

Tatti, Nikolaj, "Maximum Entropy Based Significance of Itemsets", ICDM dated 2007, Omaha, NE, dated Oct. 28-31, 2007, pp. 312-321.

(56) References Cited

OTHER PUBLICATIONS

Heule et al., "HyperLogLog in Practice: Algorithmic Engineering of a State of the Art Cardinality Estimation Algorithm", EDBT/ICDT '13 Mar. 18-22 2013, Genoa, Italy Copyright 2013 ACM, 10 pages.
Iiyas, Ihab F., et al., "CORDS: Automatic Discovery of Correlations and soft Functional Dependencies", SIGMOD dated 2004, Paris, France, Jun. 13-18, 2004, pp. 647-658.
Kornacker et al., "Impala: a Modern, Open-Source SQL Engine for Hadoop", 7thBiennial Conference on Innovative Data Systems Research (CIDR'15) dated Jan. 4-7, 2015, 10 pages.
Merriam-Webster's Collegiate Dictionary, 10th Edition, Springfield, MA, dated 1997, pp. 308-309 and 918.
Mustard et al., "JumpGate: Towards In-Network Data Processing", dated 2019, 3 pages.
Palkar, et al., "Filter Before You Parse: Faster Analytics on Raw Data with Sparser", Proceedings of the VLDB Endowment, vol. 11, No. 11, dated 2018, 14 pages.
Su et al. "Approximate Aggregates in Oracle 12C", CIKM'16 , dated Oct. 24-28, 2016, Indianapolis, in, USA, ACM, 10 pages.
Finnerty, Jim, "Avoiding the OLAP Cliff for Count Distinct Queries in Vertica", Big Data, Vertica 7, dated Mar. 5, 2014, 6 pages.
Fender et al., U.S. Appl. No. 16/155,740, filed Oct. 9, 2018, Advisory Action dated Mar. 22, 2021.
Fender et al., U.S. Appl. No. 16/155,740, filed Oct. 9, 2018, Notice of Allowance, dated Aug. 24, 2021.
Papapetrou et al., "Cardinality Estimation and Dynamic Length Adaptation for Bloom Filters", Springer Science+Business Media, DOI: 10.1007/s10619-010-7067-2, dated Sep. 2, 2010, 38 pages.

\* cited by examiner

FIG. 1

COMPUTER 100

ALL VALUES 110

| B | A | B | B | C | A | A | A | A | B | C | A | A | A | B | E | B | E | B | A | B | A | B | A |
|---|---|---|---|---|---|---|---|---|---|---|---|---|---|---|---|---|---|---|---|---|---|---|---|

SAMPLE 120

ORIGINAL STATISTICS 130

| DISTINCT VALUE | POPULATION | ACTUAL SAMPLE | EXPECTED SAMPLE | ERROR | APPARENT FREQUENCY | EXPECTED FREQUENCY |
|---|---|---|---|---|---|---|
| A | 10 | 5 | 10 × 9 / 25 = 4 | OVERSAMPLED | HIGH | HIGH |
| B | 11 | 2 | 11 × 9 / 25 = 4 | UNDER-SAMPLED | LOW | HIGH |
| C | 1 | 1 | 1 × 9 / 25 = 0 | OVERSAMPLED | LOW | MISSING |
| D | 1 | 1 | 1 × 9 / 25 = 0 | OVERSAMPLED | LOW | MISSING |
| E | 2 | 0 | 2 × 9 / 25 = 1 | UNDER-SAMPLED | MISSING | LOW |

COUNTS 140

| OBSERVED HIGH-FREQUENCY 151 | A = 1 |
|---|---|
| OBSERVED LOW-FREQUENCY 152 | B, C, D = 3 |
| UPPER BOUND ON MISSING DISTINCT VALUES 153 | E = 1 |
| DISTINCT VALUES 154 | A, B, C, D, E = 5 |
| UNDER-SAMPLED HIGH-FREQUENCY 155 | B = 1 |
| OVERSAMPLED LOW-FREQUENCY 156 | C, D = 2 |

FIG. 2

$$f_0 = \sum_{i=1}^{N} f_0^i \quad (1)$$

$$E[f_0] = E\left[\sum_{i=1}^{N} f_0^i\right] = \sum_{i=1}^{N} E[f_0^i] \quad (2)$$

$$E[f_0^i] = \text{Binom}\left(k=0, n=r, p=\frac{i}{r}\right) \cdot F_i \quad (3)$$

$$E[f_j^i] = \sum_{j=1}^{N} \text{Binom}\left(k=i, n=r, p=\frac{j}{r}\right) \cdot F_j \quad (4)$$

$$= \text{Binom}\left(k=i, n=r, p=\frac{i}{r}\right) \cdot F_i + \sum_{\substack{j=1 \\ j \neq i}}^{N} \text{Binom}\left(k=i, n=r, p=\frac{j}{r}\right) \cdot F_j \quad (5)$$

$$E[f_i] \geq \text{Binom}\left(k=i, n=r, p=\frac{i}{r}\right) \cdot F_i \quad (6)$$

$$\Rightarrow F_i \leq \frac{E[f_i]}{\text{Binom}\left(k=i, n=r, p=\frac{i}{r}\right)} \quad (7)$$

$$E[f_i] \leq \frac{\text{Binom}\left(k=0, n=r, p=\frac{i}{r}\right)}{\text{Binom}\left(k=i, n=r, p=\frac{i}{r}\right)} \cdot E[f_i] \quad (8)$$

$$E[f_0] \leq \sum_{i=1}^{N} \frac{\text{Binom}\left(k=0, n=r, p=\frac{i}{r}\right)}{\text{Binom}\left(k=i, n=r, p=\frac{i}{r}\right)} \cdot f_i \quad (9)$$

FIG. 3

$$E[f_0^{3...N}] = \sum_{i=3}^{N} f_0^i \quad (10)$$

$$= \sum_{i=3}^{N} \frac{\text{Binom}(k=0, n=r, p=\frac{1}{r})}{\text{Binom}(k=i, n=r, p=\frac{1}{r})} \cdot f_i \quad (11)$$

$$E[f_1'] = f_1 - \sum_{i=3}^{N} E[f_1^i] \quad (12)$$

$$= f_1 - \sum_{i=3}^{N} \frac{\text{Binom}(k=1, n=r, p=\frac{1}{r})}{\text{Binom}(k=i, n=r, p=\frac{1}{r})} \cdot f_i \quad (13)$$

$$E[f_2'] = f_2 - \sum_{i=3}^{N} E[f_2^i] \quad (14)$$

$$= f_2 - \sum_{i=3}^{N} \frac{\text{Binom}(k=2, n=r, p=\frac{1}{r})}{\text{Binom}(k=i, n=r, p=\frac{1}{r})} \cdot f_i \quad (15)$$

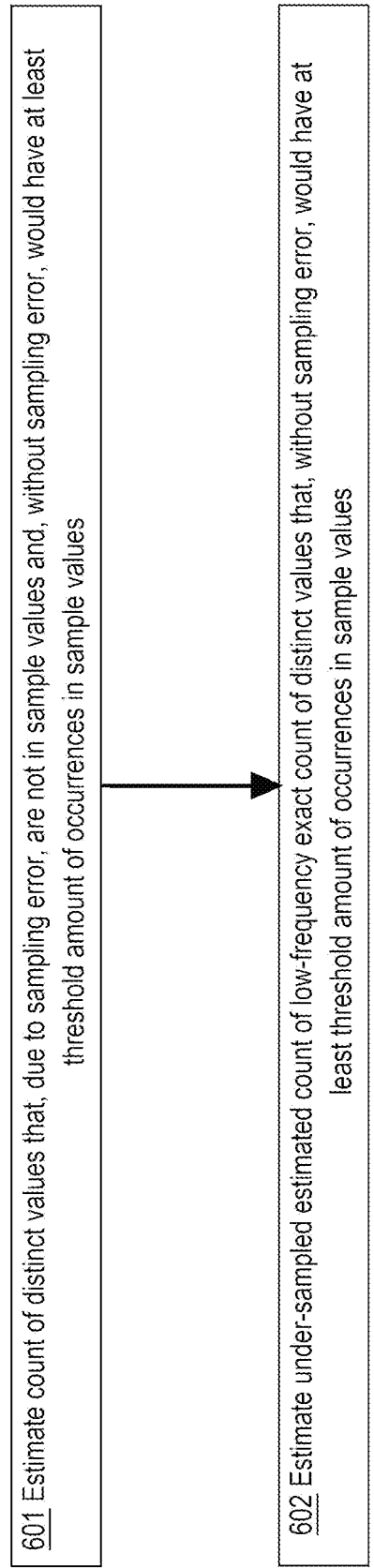

601 Estimate count of distinct values that, due to sampling error, are not in sample values and, without sampling error, would have at least threshold amount of occurrences in sample values 602 Estimate under-sampled estimated count of low-frequency exact count of distinct values that, without sampling error, would have at least threshold amount of occurrences in sample values

FIG. 7

$$p_* = \frac{r_*}{rm} = \frac{f_1 + 2f_2}{rm} \quad (16)$$

$$E[f_0'] = \text{Binom}\left(k=0, n=r, p=\frac{r_*}{rm}\right) \cdot m \quad (17)$$

$$E[f_1'] = \text{Binom}\left(k=1, n=r, p=\frac{r_*}{sm}\right) \cdot m \quad (18)$$

$$\hat{m} = \frac{E[f_1']}{\text{Binom}\left(k=1, n=r, p=\frac{r_*}{sm}\right)} \quad (19)$$

$$E[f_0'] = \frac{\left(1 - \frac{r_*}{rm}\right)^r}{r \cdot \frac{r_*}{rm}\left(1 - \frac{r_*}{rm}\right)^{r-1}} \cdot E[f_1'] \quad (20)$$

$$\Rightarrow E[f_0'] = \frac{m}{r_*}\left(1 - \frac{r_*}{rm}\right) \cdot E[f_1'] \quad (21)$$

$$m - f_1^t - f_2^t = \frac{m}{r_s}\left(1 - \frac{r_s}{rn}\right) \cdot f_1^t \quad (22)$$

$$m = \frac{f_1^t + 2f_2^t}{2f_2^t}\left(f_1^t\left(1 - \frac{1}{r}\right) + f_2^t\right) \quad (23)$$

$$m_g' = \frac{g + 2f_2^t}{2f_2^t}\left(g\left(1 - \frac{1}{r}\right) + f_2^t\right) \quad (24)$$

$$m_g = (f_1^t - g)\frac{N}{r} + m_g' \quad (25)$$

$$m_{gm} = \sqrt{\min(\overline{m}_g) \cdot \max(\overline{m}_g)} \quad (26)$$

$$\text{Error Ratio} = \max\left(\frac{\text{True NDV}}{\text{Estimate}}, \frac{\text{Estimate}}{\text{True NDV}}\right) \quad (27)$$

FIG. 8

APPROXIMATE ESTIMATION OF NUMBER OF DISTINCT KEYS IN A MULTISET USING A SAMPLE

FIELD OF THE INVENTION

The present invention relates to dataset cardinality estimation. Herein are quantitative analytics to increase the accuracy of cardinality estimation without increasing sample size.

BACKGROUND

A multiset is a set that may contain duplicate values. Calculating the number of distinct values (NDV) in a multiset is often expensive for large datasets. This is due to two excessive costs that include: a) the cost of scanning the entire multiset, and b) the cost of maintaining an in-memory structure (such as a hash table) to remember distinct values already observed during the scan. There is a large body of work with a goal of reducing the in-memory cost without reducing the scanning cost.

In contrast, the problem of estimating NDV from a small sample taken from a multiset is less well-addressed in the art. Most estimators are either impractical for current database systems due to scalability or are tailored to specific data distributions. Some estimators use a machine learning approach, where the NDV estimation problem is treated as a regression problem. Unfortunately, it is assumed that a representative dataset is available for training the model.

One reason for the dearth of literature on NDV estimation might be poor results showing that no estimator can guarantee good error bounds across all datasets. For example, most estimators are impacted by limited sample size that causes an unrepresentative sample due to sampling error. Theories for providing upper and lower bounds for estimated NDV are lacking. Likewise, heuristics for reliable simplifying assumptions also are lacking, even though in practice there may be many situations where the impact of occasional bad estimates is tolerable.

The approaches described in this section are approaches that could be pursued, but not necessarily approaches that have been previously conceived or pursued. Therefore, unless otherwise indicated, it should not be assumed that any of the approaches described in this section qualifies as prior art merely by virtue of their inclusion in this section.

BRIEF DESCRIPTION OF THE DRAWINGS

In the drawings:

FIG. 1 is a block diagram that depicts an example computer that performs novel quantitative analytics to, without increasing the size of a sample, increase the accuracy of estimating a number of distinct values (NDV) that occur in a multiset;

FIG. 2 presents a progression of mathematical formulae for calculating intermediate estimates based on binomial probabilities;

FIG. 3 presents estimation formulae for estimating upper and lower bounds of other statistical estimates;

FIG. 5 presents formulae for estimating missing values;

FIG. 6 is a flow diagram that depicts example computer activities for improving estimation accuracy;

FIG. 7 presents formulae for improving estimation accuracy;

FIG. 8 presents formulae for estimating low-frequency values;

DETAILED DESCRIPTION

Figure 4:
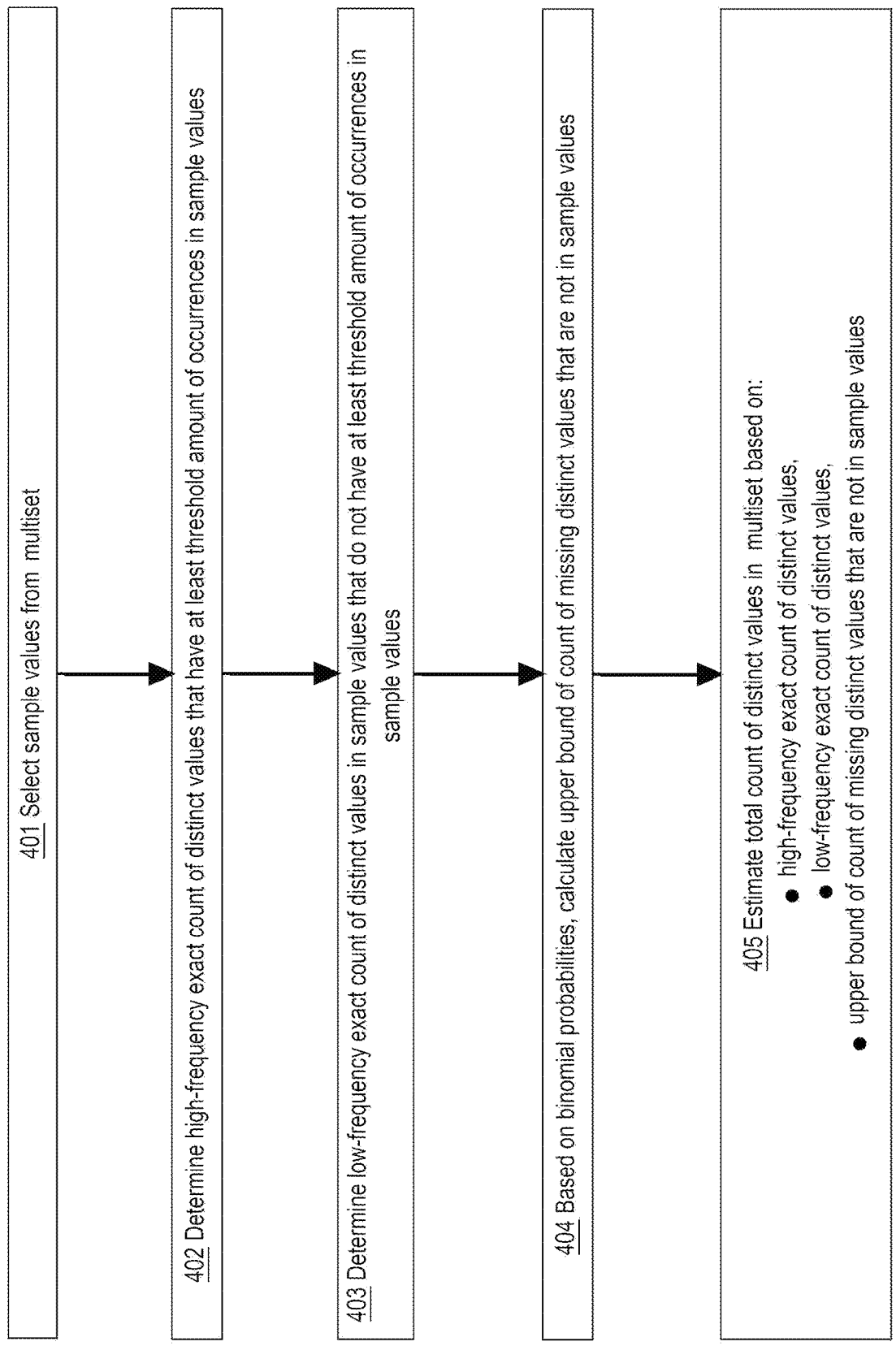
FIG. 4 is a flow diagram that depicts an example computer process for novel quantitative analytics to, without increasing the size of a sample, increase the accuracy of estimating the NDV that occur in a multiset.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

GENERAL OVERVIEW

A multiset is a set that may contain duplicate values. Cardinality is the number of distinct values (NDV) that occur in a multiset. Herein are quantitative analytics to increase the accuracy of cardinality estimation without increasing sample size. Cardinality estimation herein includes the following important advancements.

A new general expression is presented that divides cardinality estimation into two parts:
a) estimating the number of distinct high-frequency values, and b) estimating the number of distinct low-frequency values.

To improve the estimate of the number of distinct low-frequency values, two new error correction techniques are introduced: so-called histogram normalization and singleton correction.

Lower and upper bounds on the NDV estimate are provided, in addition to a scalar estimate.

Estimation approaches herein have applications in many data processing spaces, including database systems. In an embodiment, a query optimizer estimates a number of distinct groups that would result from a Group By query based on grouping column(s) of database table(s). For this purpose, the optimizer runs the Group By query on a sample taken from the table(s) and extrapolates the total number of groups from the sample results. The optimizer estimates cardinality with unprecedented accuracy and without resorting to inflexible heuristics.

A database view is an additional representation of stored data. A materialized view (MV) is an early population of a database view so that queries of the view execute faster. A database management system (DBMS) automatically creates MV(s) suitable for a given workload. In many cases, an MV is populated with the result of a frequently used Group By query. However, when the query and the MV have a very large number of groups, MV maintenance is too expensive to justify the materialization. In an embodiment, the DBMS identifies such expensive MVs early, based on cardinality estimation from a sample, to avoid the cost of materializing views that have too high a cardinality and thus are too expensive to maintain.

A DBMS may use dictionary encoding for in-memory compression and caching. Each distinct value needs its own entry in an encoding dictionary. In an embodiment, ready calculation of encoding dictionary size based on cardinality estimation from a sample achieves two benefits that are hard to achieve together: saving memory and avoiding resizing.

In an embodiment, a computer selects a few sample values from a multiset. A high-frequency exact count of distinct values that have at least a threshold amount of occurrences in the sample values is counted. A low-frequency exact count of distinct values in the sample that do not have at least the threshold amount of occurrences in the sample is counted. Based on multiple binomial probabilities, an upper bound of a count of missing distinct values in the multiset that are not in the sample is calculated. A total count of distinct values (NDV) in the multiset is estimated based on: a) the high-frequency exact count of distinct values, b) the low-frequency exact count of distinct values, and c) the upper bound of the count of missing distinct values in the multiset that are not in the sample.

Approaches herein provide unprecedented accuracy and acceleration in various ways as follows. Based on novel estimated intermediate quantities, novel quantitative analytics presented later herein provide an unprecedented increase in the accuracy of cardinality estimation without increasing the size of a sample. With estimation latency being proportional to the size of a sample, estimation latency is decreased because sample size may be decreased compared to other approaches without decreasing accuracy. Thus, quantitative analytics herein increase accuracy and/or decrease latency for a small sample, which may have the following benefits.

For example, cardinality estimation may be a discretionary activity that a query optimizer may forgo if a cost-benefit analysis is unfavorable. Decreased latency means decreased cost in a cost-benefit analysis such that cardinality estimation can be justified more often. In other words, cardinality estimation may have too high a cost with another approach, which may forgo cardinality estimation in marginal cases. Herein the tension between cost and benefit may become favorable for those same marginal cases.

Likewise, increased accuracy means increased benefit in a cost-benefit analysis such that cardinality estimation can be justified more often. Likewise, increased accuracy means decreased cost such as when an inaccurate cardinality estimate causes maintenance activities that are blocking and expensive in time and space such as rehashing, rebalancing, or reallocating that may entail excessive copying of data in a data structure. Techniques herein avoid such expensive maintenance activities.

1.0 Example Computer

FIG. 1 is a block diagram that depicts an example computer 100, in an embodiment. Computer 100 estimates the cardinality of all values 110, which is an estimate of the number of distinct values (NDV) in all values 110. Computer 100 may be one or more of a rack server such as a blade, a personal computer, a mainframe, a virtual computer, or other computing device.

Computer 100 contains or is connected to volatile and/or nonvolatile storage that contains a dataset such as a database table that contains many records that respectively contain values that collectively constitute all values 110. All values 110 is a multiset that contains many distinct and/or duplicate values. For example, all values 110 may contain scalar or tuple values such as for a primary key, a grouping key, a sort key, a compound key, or a join key for a database table. For example, all values 110 may be stored in one or more columns of one or more database tables. All values 110 may be stored in database table(s) or instead may be computed such as an intermediate result such as a result of a join or a filter.

In an embodiment, computer 100 hosts and/or operates a relational database that contains all values 110. For example, computer 100 may host a relational database management system (RDBMS) that processes and administers content of a relational database that contains relational table(s) that contain columns(s). Definitions of tables and columns may be stored in a database dictionary that stores schematic metadata that defines the structure of the database.

In an embodiment, computer 100 instead stores semi-structured documents such as JavaScript object notation (JSON) or extensible markup language (XML). For example, each document may contain one or more values of all values 110. In an embodiment, computer 100 instead stores bulk data files such as with Hadoop distributed filesystem (HDFS) in a file format that may be horizontally and/or vertically partitioned such as with optimized row columnar (ORC) or Apache Parquet. In other words, data processing techniques herein are not limited to a particular paradigm of storage or schema.

1.1 Data Processing

Computer 100 performs novel quantitative analytics to, without increasing the size of sample 120, increase the accuracy of estimating a count of distinct values 154 that occur in all values 110. For various data processing activities such as joining, sorting, or grouping during execution of a database query, computer 100 may allocate and configure a data structure (not shown) such as an aggregation structure such as a histogram or a hash table. The size of the data structure, such as a count of hash buckets or histogram bins or a width of an indexing integer, may depend on how many distinct values do all values 110 contain. The kind and configuration of the data structure may depend on how many distinct values does all values 110 contain such as choosing an array or a lookup table or a hash table as the data structure. A penalty for inaccurately estimating cardinality may include maintenance activities that are blocking and expensive in time and space such as rehashing, rebalancing, or reallocating that may entail excessive copying of data in the data structure.

Computer 100 estimates the cardinality of all values 110, which is an estimate of the number of distinct values (NDV) in all values 110. For example, the leftmost two values shown in all values 110 are A-B. If all 25 values in all values also were A-B, then the cardinality of all values 110 would be two, which could be precisely measured by scanning all of all values 110. However, scanning may be temporally infeasible if all values 110 contains billions or trillions of values.

Instead of precisely measuring cardinality by scanning, computer 100 estimates cardinality by sampling sample 120 that is a small portion of all values 110. As shown, sample 120 includes left and right values C-D and, between those, many duplicate values of A-B. Sample 120 is demonstratively shown as a contiguously stored portion of all values 110. In practice, sample 120 would not be contiguously stored in all values 110. For example, sample 120 may contain every hundredth value of all values 110 or a randomly sampled one percent of all values 110. In any case, all values 110 is unsorted.

1.2 Data Statistics

For cardinality estimation, computer 100 performs quantitative analytics in two demonstrative phases that respectively involve demonstrative statistics 130 and 140 as follows. Original statistics 130 is shown as a demonstrative table having columns that may or may not be implied, calculated, and/or stored. In other words, some shown parts of original statistics 130 may be demonstrative and not actually implemented. Indeed for original statistics 130, only the actual sample column and apparent frequency column shown bold need implementation, as explained later herein.

Original statistics 130 is more or less directly based on all values 110 and sample 120 as follows. Each row A-E of original statistics 130 represents a distinct value of all values 110, as demonstratively shown in the distinct value column. Because computer 100 does not scan all values 110, computer 100 does not know that all values 110 has five distinct values that are A-E. Nor does computer 100 have an encoding dictionary that would reveal the five distinct values.

Likewise, computer 100 also does not know how many duplicates does each distinct value have in all values 110. For example, the population column demonstratively shows that value B has the most duplicates and values C-D have no duplicates. The only empirical data that computer 100 has may be: a) all values 110 has 25 values including duplicates, and b) as shown in the actual sample column, sample 120 has nine values that consist of five A values, two B values, one C value, and one D value. Value E does not occur in sample 120, and computer 100 does not know whether or not value E occurs in all values 110.

1.3 Sampling Error

As explained above, the actual sample column counts values that actually occur in sample 120, which may facilitate various estimations such as: a) how many times does value A occur in all values 110 or b) how many distinct values occur in all values 110. For example, value A repeatedly occurs in sample 120, but value C occurs only once in sample 120, which suggests that value A might have more duplicates in all values 110 than does value C. However, sample 120 is small, especially when compared to all values 110, such that contents of sample 120 are prone to sampling error that distorts statistics and estimates as follows.

Thus, some values may be repeated in sample 120 more than statistically expected, and other values may be repeated less than statistically expected. For example as demonstratively shown in the expected sample column, values A-B were each expected to occur a same (i.e. four) amount of times in sample 120, but instead value A occurred more than twice as many times as value B in sample 120. Likewise, value C is so rare in all values 110 that value C was expected to not occur in sample 120 but did. Likewise, value E was expected to occur in sample 120 but did not.

Thus, sampling error may cause distortions for any or all of values A-E. In some examples, some of values A-E may actually occur in sample 120 as statistically expected. However in this example as demonstratively shown in the error column, all of values A-E have distortions from sampling error. For example, value A is oversampled because actual occurrences in sample 120 are higher than expected. Likewise, value B is under-sampled. However, computer 100 does not know which values were over or under sampled nor how often were values A-E expected to occur in sample 120 because computer 100 does not know how often values A-E respectively occur in all values 110.

Respective distortions for values A-E may have different respective quantitative impacts on a cardinality estimate for all values 110. For example, the fact that value A was expected to occur four times in sample 120 but actually occurred five times may be a minor error that should not decrease the accuracy of cardinality estimation. However with rare values C-E, distortions can significantly and quantitatively decrease cardinality estimation accuracy. For example based on sample 120, computer 100 may wrongly infer that value E does not occur in all values 110, which would cause computer 100 to underestimate the cardinality of all values 110.

Thus although distortions may have a quantitative impact on accuracy, the statistical tendency for rare values to cause inaccuracy means that rare values are qualitatively different from common values. Thus, quantitative analytics should attempt to distinguish rare values from common values and qualitatively process them differently as follows.

1.4 Value Frequency

Herein, a rare value is known as a low-frequency value. Likewise, a common value is known as a high-frequency value, with an implementation-dependent threshold amount of occurrences of that value in sample 120 that separates low-frequency from high-frequency. For example in the shown embodiment, the threshold is three such that values that occur in sample 120 more than twice are high-frequency.

For example, value A occurs five times in sample 120 which equals or exceeds the threshold, which is why the apparent frequency column classifies value A as apparently high. Value B occurs twice in sample 120 which is less than the threshold, which is why the apparent frequency column classifies value B as apparently low. As shown in the expected sample column, value B was expected to occur four times in sample 120, which is why the expected frequency column classifies value B as high, even though the apparent frequency of value B is low.

The expected frequency of values C-D is missing, which means that values C-D were not expected to occur in sample 120 even though values C-D actually do occur in sample 120. The apparent frequency of value E is missing, which means that value E did not occur in sample 120 even though value E was expected to occur in sample 120.

However, computer 100 does not know expected frequencies of values A-E because computer 100 does not know how often values A-E respectively occur in all values 110. Thus when apparent frequency and expected frequency disagree for a value, accuracy of estimated cardinality decreases. For example, only for value A do apparent frequency and expected frequency agree.

With so many values B-E having distorted apparent frequencies, a cardinality estimate will not be accurate unless quantitative adjustments herein are made. Although mathematics for adjusting estimated cardinality are presented later herein, the following calculated quantities shown in counts 140 may be used as adjustment terms and factors in various embodiments. Counts 140 includes quantities 151-156, some of which are exact as empirically detected in sample 120, and others are mathematically estimated with more or less accuracy as discussed later herein.

As explained earlier herein, an implementation-dependent threshold amount of occurrences in sample 120 separates low-frequency values from high-frequency values. Observed high-frequency 151 is a precise count of how many distinct values have occurrences actually equaling or exceeding the threshold in sample 120. For example, the apparent frequency column shows that only value A is apparently high-frequency. Thus, observed high-frequency 151 is one as shown.

Likewise, observed low-frequency 152 is a precise count of how many distinct values that occurred in sample 120 were less than the threshold in sample 120. For example, the apparent frequency column shows that values B-D are apparently low-frequency. Thus, observed low-frequency 152 is three as shown.

1.5 Intermediate Estimations

Quantities 153-154 are estimates as follows. Upper bound on missing distinct values 153 is an estimated upper bound on how many distinct values in all values 110 are not in sample 120. In this example, only value E is in all values 110 and not in sample 120. Thus, upper bound on missing distinct values 153 should be one as shown. Because computer 100 does not know the contents of all values 110, upper bound on missing distinct values 153 is necessarily an estimate. Novel quantitative analytics for increased accuracy of estimating upper bound on missing distinct values 153 are presented later herein.

Distinct values 154 is an estimated number of distinct values (NDV) for all values 110, which is a cardinality estimate. All values 110 contains five distinct values A-E. Thus, distinct values 154 should be five as shown. However, computer 100 does not know the contents of all values 110. Thus distinct values 154, as estimated later herein, may or may not be five.

Based on upper bound on missing distinct values 153 and novel other estimated quantities presented later herein, novel quantitative analytics presented later herein provide an unprecedented increase in the accuracy of estimated distinct values 154 without increasing the size of sample 120. That is, sample 120 may be less than one percent of all values 110 and distinct values 154 may have increased accuracy.

As explained later herein, various embodiments may further increase the accuracy of estimated quantities 153 and/or 154 based on additional quantities 155-156 that are estimates as follows. Under-sampled high-frequency 155 is an estimate of how many distinct values that are apparently low-frequency but were expected to be high-frequency. In this example, only value B is apparently low-frequency despite being expectedly high-frequency. Thus, under-sampled high-frequency 155 should be one as shown.

However, computer 100 does not know expected frequencies of values A-E because computer 100 does not know how often values A-E respectively occur in all values 110. Thus under-sampled high-frequency 155, as estimated later herein, may or may not be one. In any case and although not shown, under-sampled high-frequency 155 does not include expectedly high-frequency values that, due to sampling error, did not occur in sample 120.

Oversampled low-frequency 156 is an estimate of how many distinct values occurred in sample 120 but were expected not to occur in sample 120. For example, the expected frequency of values C-D is missing, which means that values C-D were not expected to occur in sample 120 even though values C-D actually do occur in sample 120. Thus, oversampled low-frequency 156 should be two as shown. However, computer 100 does not know expected frequencies of values A-E because computer 100 does not know how often values A-E respectively occur in all values 110. Thus oversampled low-frequency 156, as estimated later herein, may or may not be two.

1.6 Cardinality Optimization

As defined herein, estimated quantities 155-156 are novel. Based on estimated quantities 155-156, novel quantitative analytics presented later herein provide an unprecedented increase in the accuracy of estimated distinct values 154 without increasing the size of sample 120.

With estimation latency being proportional to the size of sample 120, estimation latency is decreased because the size of sample 120 may be decreased compared to other approaches without decreasing accuracy. Thus, quantitative analytics herein increase accuracy and/or decrease latency, which may have the following benefits. For example, cardinality estimation may be a discretionary activity that a query optimizer may forgo if a cost-benefit analysis is unfavorable. Estimation of cardinality allows a query optimizer to generate execution plans that can be executed in less time use and use less computer resources, such as memory and CPU cycles.

Decreased latency means decreased cost in a cost-benefit analysis such that cardinality estimation can be justified more often. In other words, cardinality estimation may have too high a cost with another approach, which may forgo cardinality estimation in marginal cases. Herein the tension between cost and benefit may become favorable for those same marginal cases.

Likewise, increased accuracy means increased benefit in a cost-benefit analysis such that cardinality estimation can be justified more often. Likewise, increased accuracy means decreased cost such as when an inaccurate cardinality estimate causes maintenance activities that are blocking and expensive in time and space such as rehashing, rebalancing, or reallocating that may entail excessive copying of data in a data structure. Techniques herein avoid such expensive maintenance activities.

2.0 Example Estimation Formulae

FIGS. 2-3 present a progression of mathematical formulae 1-9 for estimating upper bound on missing distinct values 153 based on binomial probabilities, in an embodiment. The culmination of this progression of mathematical formulae 1-9 is estimation formula 9 that estimates upper bound on missing distinct values 153 as follows. FIGS. 2-3 are discussed with reference to FIG. 1.

Mathematical formulae 1-9 employ a special statistical notation as follows. Herein, $f_i$ is a count of distinct values that occur i times in sample 120. For example, $f_0$ is a count of missing distinct values that occur zero times in sample 120 even though all of the missing distinct values are in all values 110. In some cases, sampling error causes a distinct value to be unsampled. In other cases even without sampling error, a value may be too infrequent in all values 110 to be statistically likely to occur in sample 120 because sample 120 may be much smaller than all values 110.

2.1 Bernoulli Probability

Bernoulli probability is the statistical likelihood that a distinct value in all values 110 will occur in a particular position in sample 120, which is inversely proportional to the size of all values 110 and directly proportional to a count of occurrences of the distinct value in all values 110. Perfect sampling that precisely reflects Bernoulli probabilities may entail sample 120 and all values 110 having a same size, which is impractical. Practical sampling necessarily entails sampling error due to a smaller sample 120. Thus, Bernoulli probability is ideal and occurs only with perfect sampling that lacks sampling error.

With perfect sampling, Bernoulli probability for a value could be derived from sample 120 as follows. With perfect sampling, Bernoulli probability would be i/r, where r is the size of sample 120, and i is a count of occurrences of the value in sample 120. Based on Bernoulli probability, various calculations and estimations may be performed as follows. For example, a statistically expected (i.e. estimated) count of occurrences of a value in sample 120 may be calculated based on Bernoulli probability even though an actual count of occurrences of that value in sample 120 may be different.

Herein, $f_h^i$ is a count of distinct values that, due to sampling error, occur h times in sample 120 but, without sampling error, were statistically expected to instead occur i times in sample 120. Due to sampling error, i and h are different. Without sampling error, such as ideally or accidentally, i and h are identical.

Shown summation formula 1 defines the count of all missing distinct values (distinct values in all values 110 that do not occur in sample 120) as a sum of counts of missing distinct values that, according to Bernoulli probabilities and without sampling error, would have occurred i times in sample 120. Due to imperfect sampling, computer 100 should not directly use summation formula 1.

Herein, $E[f_i]$ is an estimate of $f_i$. Estimation formula 2 shows that an estimate of all missing distinct values may be based on substituting $E[f_0^i]$ for $f_0^i$ in summation formula 1.

2.2 Binomial Probability

Estimation formula 3 estimates how many distinct values that, based on Bernoulli probability, were expected to occur i times in sample 120 but instead are missing from sample 120. The following terms are used in estimation formula 3.

Binom(k,n,p) is the standard binomial probability formula that when given input (k,n,p) returns the probability of a given value being selected k times in n trials, if the probability of selection in one trial is p. When k is zero, this is the binomial probability of not being selected in sample 120. While a Binomial distribution is used herein, a Beta-Binomial distribution could instead be used.

To estimate the probability that a value observed i times in the current sample is not selected in a sample of this size, k is set to 0, n is set to the sample size r, and p is set to i/r.

$F_i$ is the estimated count of distinct values that have the same Bernoulli probability p=i/r of selection as a value with observed frequency i in sample.

It may be counterintuitive that the formula calculates the probability of a value not being present in sample 120, even though the value is observed to be present in sample 120. However, the value i is treated as representative of the $F_i$ values, some of which are actually absent from sample 120. The goal of the formula is to estimate how many values with statistical characteristics similar to an observed value are missing from the sample.

As explained above, estimation formula 3 estimates how many distinct values are missing in sample 120, which is why k is zero. When k is not zero, estimation formula 4 estimates how many distinct values, without sampling error, would occur i times in sample 120. In estimation formula 4, j is variable, which means that Bernoulli probability p also is variable. That is, estimation formula 4 estimates how many distinct values should occur i times in sample 120, even though those distinct values occur in all values 110 with different respective frequencies.

In other words, estimation formula 4 includes some under-sampled, oversampled, and accurately sampled distinct values. Thus, estimation formula 4 should not be directly used to estimate how many distinct values should, due to sampling error, occur i times in sample 120.

Estimation formula 5 has two binomial probability expressions as a restatement of estimation formula 4 such that, for distinct values that could occur i times in sample 120, the left binomial probability is used when i and j are identical to estimate a count of distinct values that accurately occur i times in sample 120, and the right binomial probability is used when i and j are different to estimate a count of distinct values that would erroneously occur i times in sample 120. That is, equality of i and j means incidentally accurate sampling, and inequality of i and j connotes sampling error.

3.0 Bounded Estimation

FIG. 3 presents estimation formulae 6-9 for estimating upper and lower bounds based on earlier formulae 1, 3, and 5 as follows. As explained above, estimation formula 5 provides an estimate based on left and right terms that both provide positive numeric contributions. Removal of either left or right term from estimation formula 5 would cause underestimation.

For example, estimation formula 6 removes the right term from estimation formula 5. Thus, estimation formula 6 underestimates estimation formula 5. Estimation formula 7 rearranges estimation formula 6 to isolate which is an overestimation. Thus, estimation formula 7 provides an estimated upper bound on a count of distinct values that are expected to have i occurrences in sample 120 as explained above.

The upper bound for $F_i$, can be taken from estimation formula 7 and substituted into estimation formula 3 to define estimation formula 8 that calculates an upper bound on how many distinct values are missing in sample 120 that, without sampling error, would occur i times in sample 120. Combining formulae 1 and 8 achieves estimation formula 9 that calculates an upper bound on how many distinct values are missing in sample 120, even though those missing distinct values have different respective Bernoulli probabilities.

Based on Bernoulli probabilities and binomial probabilities, estimation formula 9 is a novel way to estimate how many distinct values are missing in sample 120. For example, upper bound on missing distinct values 153 of FIG. 1 may be calculated according to estimation formula 9. By itself, estimation formula 9 is substantially accurate in practice even when sample 120 is small such as one percent of all values 110.

As explained later herein, upper bound on missing distinct values 153 is used to estimate distinct values 154 in a substantially accurate way even when sample 120 is small. Presented later herein are additional formulae for increasing the accuracy of distinct values 154 in various ways.

4.0 Example Cardinality Estimation Process

FIG. 4 is a flow diagram that depicts computer 100 performing novel quantitative analytics to, without increasing the size of sample 120, increase the accuracy of estimating a count of distinct values 154 that occur in all values 110, in an embodiment. FIG. 4 is discussed with reference to FIGS. 1 and 3.

Step 401 selects sample values from a multiset. For example, the multiset may be database table(s) or a row set, or column(s) of the table(s) or row set. For example, step 401 selects sample 120 from all values 110 that may be a table column that is not dictionary encoded. For example, sample 120 may be randomly sampled and: a) copied into a buffer or an array, and/or b) tallied into a hash table or histogram that counts occurrences of each distinct value in sample 120.

Step 402 determines a high-frequency exact count of distinct values that respectively have at least a threshold amount of occurrences in the sample values. For example, step 402 sets observed high-frequency 151 according to sample 120 and an example threshold of three as discussed earlier herein.

Step 403 determines a low-frequency exact count of distinct values in the sample values that do not have at least the threshold amount of occurrences in the sample values.

For example, step 403 sets observed low-frequency 152 according to sample 120 and the example threshold of three as discussed earlier herein.

Based on binomial probabilities, step 404 calculates upper bound of count of missing distinct values 153 that are not in sample 120. For example, step 404 may calculate upper bound of count of missing distinct values 153 according to estimation formula 9 as explained earlier herein.

Step 405 estimates a total count of distinct values 154 in all values 110. Thus, step 405 estimates the cardinality of all values 110. For example, summation of quantities 151-153 of FIG. 1 may provide an upper bound on distinct values 154. In an embodiment, the upper bound calculated by step 405 may be an estimate of distinct values 154. In various embodiments for increased accuracy of estimation, the estimate of distinct values 154 is further based on various arithmetic adjustments presented later herein.

5.0 Estimating Missing Values

As explained earlier herein, an implementation-dependent threshold amount of occurrences in sample 120 separates low-frequency values from high-frequency values when sampling is perfect. Formally, high-frequency values have higher Bernoulli probabilities than low-frequency values. However due to sampling error, sample 120 may not reflect Bernoulli probabilities. For example due to under-sampling, some high-frequency values may erroneously appear to be low-frequency in sample 120, shown as under-sampled high-frequency 155, or instead may be absent from sample 120.

As explained earlier herein, also some low-frequency values may be absent from sample 120. For example as explained earlier herein, value E was expected to occur once in sample 120 based on Bernoulli probability but instead, due to sampling error, is missing from sample 120. However, not all values absent from sample 120 are missing due to sampling error. For example, a value may have a Bernoulli probability so low that the value is not expected to occur in sample 120.

Thus, values having different frequencies and Bernoulli probabilities may be missing from sample 120 for different statistical reasons. FIG. 5 presents estimation formulae 10-15 that may be used directly or indirectly, as explained later herein, for estimating counts of distinct values that are missing from sample 120. As follows, estimation formulae 10-11 directly estimate a count of missing high-frequency values, and estimation formulae 12-15 estimate a total count of actual low-frequency values that may be indirectly used to estimate a count of high-frequency values that, due to sampling error, are apparent low-frequency values as explained later herein. FIG. 5 is discussed with reference to FIGS. 1 and 3.

Estimation formulae 10-11 are based on estimation formula 9 with a restriction that only high-frequency values are included. In the shown example, the threshold that separates low and high frequencies is three. Thus, estimation formulae 10-11 include three as a constant. Three means that, with perfect sampling, any given high-frequency value is expected to occur at least three times in sample 120.

Estimation formulae 12-15 estimate, in two parts, a total count of distinct low-frequency values as follows. By definition, an actual low-frequency value is a value that, with perfect sampling, would not occur in sample 120 as many times as the threshold that separates low and high frequencies. When the threshold is three and sampling is perfect, an actual low-frequency value would not occur more than twice in sample 120 such as values C-E in FIG. 1. However due to erroneous under-sampling, an apparent low-frequency value may instead be an actual high-frequency value such as value B.

Estimation formulae 14-15 are leveraged later herein based on categories (a)-(b) of the following Bernoulli categories (a)-(d) of apparent low-frequency values. When the threshold is three, sample 120 can contain only four categories of apparent low-frequency values, which are:

category (a): low-frequency values that were expected to occur only once or twice in sample 120 according to Bernoulli probability and actually occur only once in sample 120 category (b): low-frequency values that were expected to occur only twice in sample 120 according to Bernoulli probability and actually occur twice in sample 120 category (c): under-sampled high-frequency values category (d): oversampled low-frequency values that were not expected to occur in sample 120 due to extremely low Bernoulli probability Due to sampling error, categories (a)-(d) can only be estimated. In addition to category (d), actual low-frequency values in sample 120 include categories (a)-(b) that are estimated as follows. Estimation formulae 12-13 estimate category (a) that only includes actual low-frequency values occurring once in sample 120. Thus, estimation formulae 12-13 include one as a constant. Estimation formulae 14-15 estimate category (b) that only includes actual low-frequency values occurring twice in sample 120. Thus, estimation formulae 14-15 include two as a constant.

Mathematical formulae 12-15 employ a special statistical notation as follows. Herein, f' is a count of distinct values that actually are low-frequency, regardless of whether or not those values occur in sample 120. For example, $f'_1$ is category (a) and $f'_2$ is category (b). Categories (a)-(b) may be used to estimate category (c) as explained later herein.

6.0 Estimation Improvement Activities

FIG. 6 is a flow diagram that depicts computer 100 performing novel quantitative analytics to directly estimate missing high-frequency values and estimate total low-frequency values that may be indirectly used to estimate missing low-frequency values as explained later herein. FIG. 6 is discussed with reference to FIGS. 1 and 5.

Step 601 estimates a count of missing high-frequency values as follows. As explained earlier herein, an implementation-dependent threshold amount of occurrences in sample 120 separates low-frequency values from high-frequency values when sampling is perfect. Step 601 estimates a count of distinct values that, due to sampling error, are not in sample 120 and, without sampling error, would have at least the threshold amount of occurrences in sample 120. For example when the threshold is three, step 601 estimates how many distinct values, with perfect sampling, were expected to occur at least three times in sample 120 but, due to sampling error, are missing in sample 120. In an embodiment, step 601 applies estimation formula 11.

Step 602 estimates category (c) that is a count of high-frequency values that, due to erroneous under-sampling, are apparent low-frequency values. Step 602 estimates an under-sampled estimated count of the apparent low-frequency exact count of distinct values that, without sampling error, would have at least the threshold amount of occurrences in sample 120. In other words, step 602 estimates under-sampled high-frequency 155 as a subset of observed low-frequency 152. That is, step 602 estimates category (c) by subtracting categories (a)-(b) from observed low-frequency 152. Herein, observed and apparent are synonyms.

In an embodiment, step 602 applies estimation formulae 13 and 15 to estimate categories (a)-(b).

7.0 Estimation Improvement Formulae

It is more or less uncommon for a high-frequency value to be missing in sample 120, and the impact of such an error for estimating distinct values 154 is minor. However the converse, actual low-frequency values that are missing in sample 120, may be more common and thus may have a greater impact on estimation accuracy that may be mitigated as follows.

FIGS. 7-8 present mathematical formulae 16-27 that increase estimation accuracy as follows. In mathematical formulae 16-23 is m that is an estimated total count of distinct actual low-frequency values in all values 110 regardless of whether or not those distinct values occur in sample 120. Herein, subtracting categories (a)-(b) from m gives a difference that is an estimation of $f_0$ that is a count of missing distinct actual low-frequency values that are not in sample 120.

Example formula 16 is based on a simplifying assumption that all distinct actual low-frequency values have a same Bernoulli probability $p_s$ of occurring at least once in sample 120. In example formula 16, $r_s$ is an estimate of how many (e.g. non-distinct) values in sample 120 are actual low-frequency values. Here, $r_s$ need not be calculated because, as explained later herein, $r_s$ can be cancelled out of subsequent calculations.

Estimation formulae 17-18 respectively estimate how many distinct actual low-frequency values respectively occur zero or one time in sample 120 based on example formula 16. In estimation formula 19, In is an estimate of m based on estimation formula 18. Estimation formula 20 substitutes m for m in estimation formula 17. Estimation formula 21 simplifies estimation formula 20.

As explained above, subtracting categories (a)-(b) from m gives a difference that is an estimation of $f_0$ that is a count of missing distinct actual low-frequency values that are not in sample 120. In other words, $f_0 = m - f_1 - f_2$ that estimation formula 22 substitutes into estimation formula 21.

Estimation formula 23 isolates m in estimation formula 22. In other words, estimation formula 23 estimates a total count of distinct actual low-frequency values in all values 110 regardless of whether or not those distinct values occur in sample 120. Estimation formula 23 may be leveraged because distinct values 154 is the sum of: a) m, b) observed high-frequency 151, and c) a count of distinct high-frequency values that are missing in sample 120 per estimation formula 11. In other words, distinct values 154 may be estimated in a novel way based on estimation formulae 11 and 23.

8.0 Low-Frequency Values

As explained above, m is an estimated total count of distinct actual low-frequency values in all values 110 regardless of whether or not those distinct values occur in sample 120. Also as explained above, distinct values 154 is the sum of counts of distinct actual: low-frequency values (m) and high-frequency values. Mathematical formulae 24-27 provide novel ways of estimating, bounding, and analyzing m as follows.

As explained earlier herein, an implementation-dependent threshold amount of occurrences in sample 120 separates low-frequency values from high-frequency values when sampling is perfect. Also as explained above, $m = f_0 + f_1 + f_2$ when the threshold is three. Also as explained above, $f_0$ does not occur in sample 120.

As shown in estimation formula 24, g is the subset of $f_1$ that was under-sampled. In other words, g is the subset of $f_1$ that, without sampling error, would have instead been part of $f_2$. In other words, $f_1^1 = f_1 - g$. Thus, g may be less than or equal to which means that g may be within a range of values. As shown in estimation formula 24, $m'_g$ is an estimate of m for a given value of g within that range of values.

Here, $f_1^1$ means values that occur only once in sample 120 as expected by Bernoulli probability, but those values may occur more than once in all values 110 because all values 110 is bigger than sample 120. Estimation formula 25 simplifies estimation formula 24 by assuming that all values in $f_1^1$ occur only once in all values 110.

As mentioned above, $m'_g$ is an estimate of m for a given value of g within a range of values from one to Thus, g has a sequence of possible values that may substitute for g in estimation formula 25 to calculate a sequence of estimates $m_g$ that is shown as $\vec{m}_g$ in estimation formula 26 that calculates the geometric mean of the minimum and maximum values in calculated sequence $\vec{m}'_g$.

Estimation formula 26 estimates m with unprecedented accuracy in a novel way which, as explained earlier herein, can be used to estimate distinct values 154 with unprecedented accuracy even if sample 120 is small. Error ratio formula 27 may be used to measure how accurate is estimated distinct values 154. As shown in error ratio formula 27: a) Estimate is estimated distinct values 154 as estimated by estimation formula 26 based on sample 120, and b) True NDV is an actual number of distinct values (NDV) in all values 110 such as by scanning all values 110.

9.0 Example Estimation Activities

Figure 9:
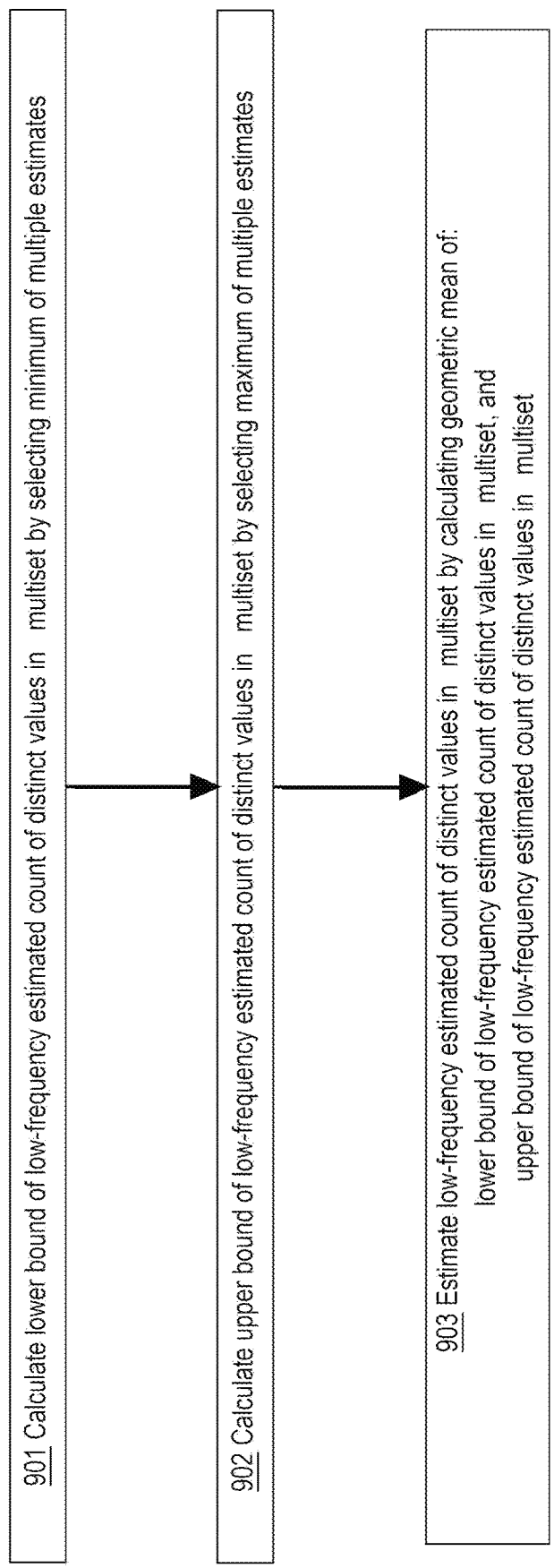
FIG. 9 is a flow diagram that depicts example computer activities for analyzing low-frequency values.

FIG. 9 is a flow diagram that depicts example estimation activities that computer 100 may implement. FIG. 9 is discussed with reference to FIGS. 1 and 7-8.

As explained earlier herein, an implementation-dependent threshold amount of occurrences in sample 120 separates low-frequency values from high-frequency values when sampling is perfect. Also as explained earlier herein, m is an estimated total count of distinct actual low-frequency values in all values 110 regardless of whether or not those distinct values occur in sample 120. As explained earlier herein, estimation formula 25 may be used to calculate a sequence of estimates $\vec{m}_g$ that are alternative estimates of m.

Step 901 calculates a lower bound of a low-frequency estimated count of distinct values in all values 110 by selecting the minimum of multiple estimates in $\vec{m}_g$. Step 902 calculates an upper bound of the low-frequency estimated count of distinct values in all values 110 by selecting the maximum of multiple estimates in $\vec{m}_g$. Steps 901-902 regard actual low-frequency values, which is $m = f_0 + f_1 + f_2$.

With unprecedented accuracy, step 903 estimates the low-frequency estimated count of distinct values in all values 110 by calculating a geometric mean of the lower bound of low-frequency estimated count of distinct values and the upper bound of low-frequency estimated count of distinct values as calculated by steps 901-902. In an embodiment, step 903 applies estimation formula 26.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
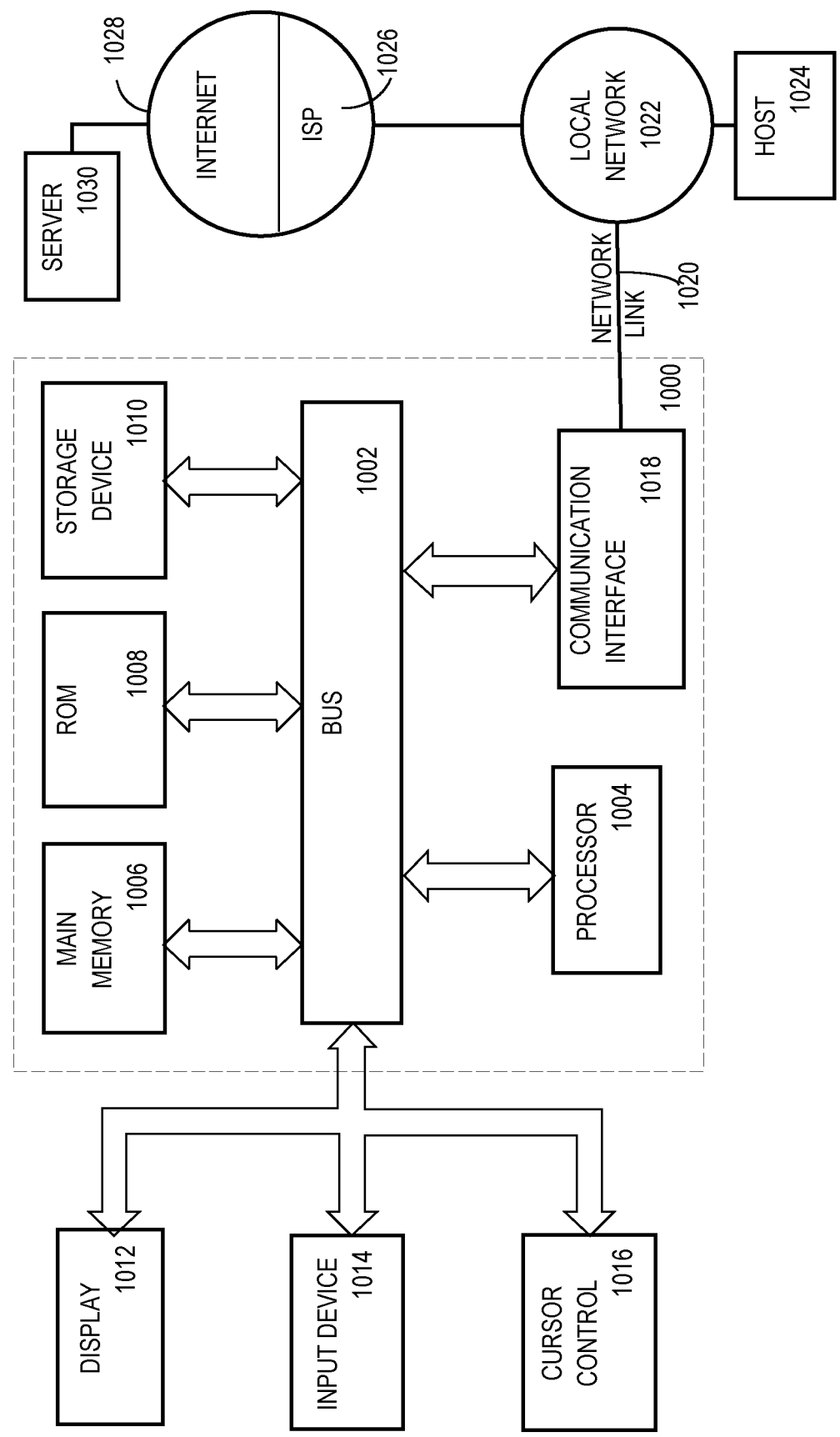
FIG. 10 is a block diagram that illustrates a computer system upon which an embodiment of the invention may be implemented.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Software Overview

Figure 11:
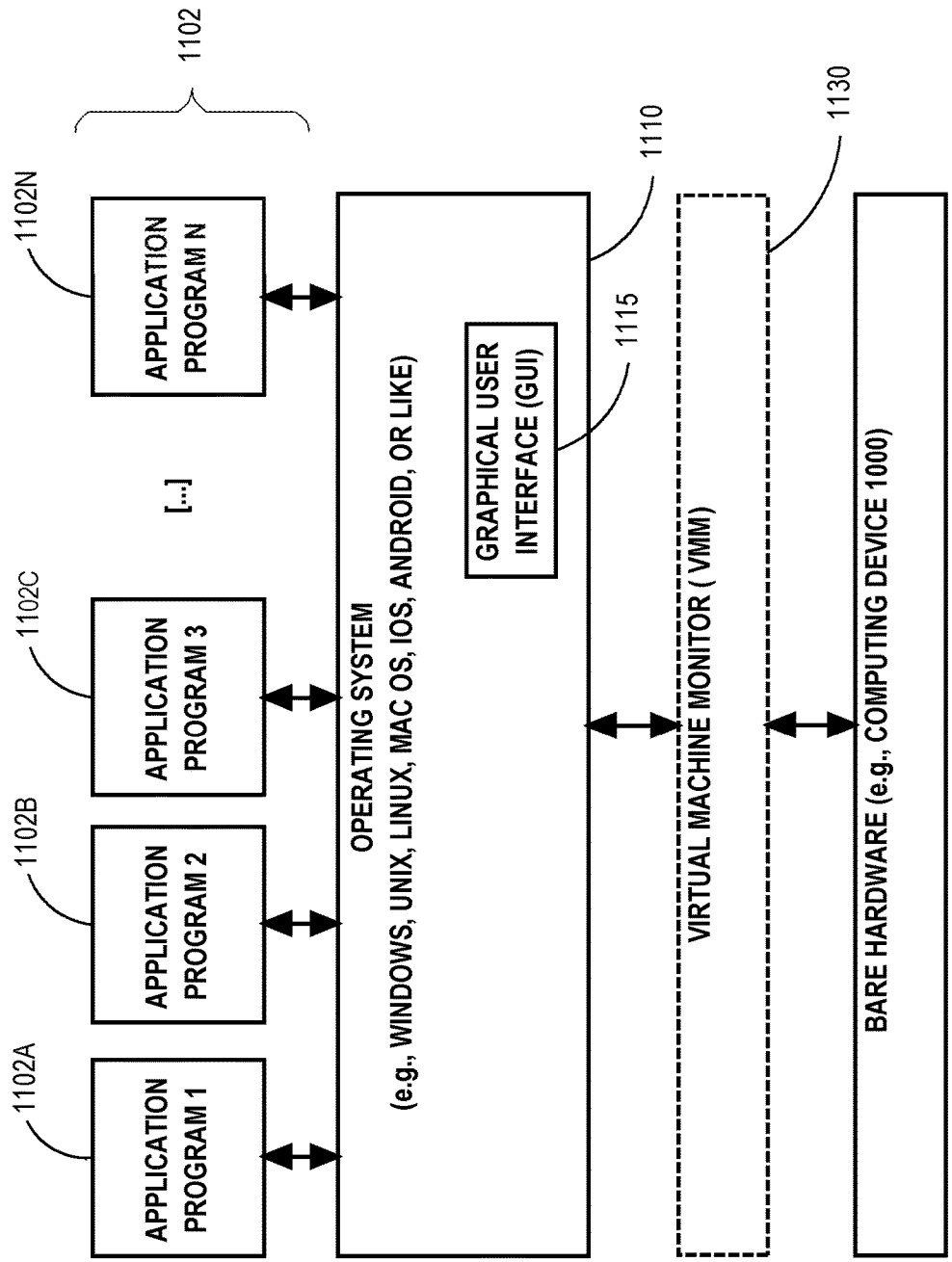
FIG. 11 is a block diagram that illustrates a basic software system that may be employed for controlling the operation of a computing system.

FIG. 11 is a block diagram of a basic software system 1100 that may be employed for controlling the operation of computing system 1000. Software system 1100 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1100 is provided for directing the operation of computing system 1000. Software system 1100, which may be stored in system memory (RAM) 1006 and on fixed storage (e.g., hard disk or flash memory) 1010, includes a kernel or operating system (OS) 1110.

The OS 1110 manages low-level aspects of computer operation, including managing execution of processes, memory allocation, file input and output (I/O), and device I/O. One or more application programs, represented as 1102A, 1102B, 1102C . . . 1102N, may be "loaded" (e.g., transferred from fixed storage 1010 into memory 1006) for execution by the system 1100. The applications or other software intended for use on computer system 1000 may also be stored as a set of downloadable computer-executable instructions, for example, for downloading and installation from an Internet location (e.g., a Web server, an app store, or other online service).

Software system 1100 includes a graphical user interface (GUI) 1115, for receiving user commands and data in a graphical (e.g., "point-and-click" or "touch gesture") fashion. These inputs, in turn, may be acted upon by the system 1100 in accordance with instructions from operating system 1110 and/or application(s) 1102. The GUI 1115 also serves to display the results of operation from the OS 1110 and application(s) 1102, whereupon the user may supply additional inputs or terminate the session (e.g., log off).

OS 1110 can execute directly on the bare hardware 1120 (e.g., processor(s) 1004) of computer system 1000. Alternatively, a hypervisor or virtual machine monitor (VMM) 1130 may be interposed between the bare hardware 1120 and the OS 1110. In this configuration, VMM 1130 acts as a software "cushion" or virtualization layer between the OS 1110 and the bare hardware 1120 of the computer system 1000.

VMM 1130 instantiates and runs one or more virtual machine instances ("guest machines"). Each guest machine comprises a "guest" operating system, such as OS 1110, and one or more applications, such as application(s) 1102, designed to execute on the guest operating system. The VMM 1130 presents the guest operating systems with a virtual operating platform and manages the execution of the guest operating systems.

In some instances, the VMM 1130 may allow a guest operating system to run as if it is running on the bare hardware 1120 of computer system 1100 directly. In these instances, the same version of the guest operating system configured to execute on the bare hardware 1120 directly may also execute on VMM 1130 without modification or reconfiguration. In other words, VMM 1130 may provide full hardware and CPU virtualization to a guest operating system in some instances.

In other instances, a guest operating system may be specially designed or configured to execute on VMM 1130 for efficiency. In these instances, the guest operating system is "aware" that it executes on a virtual machine monitor. In other words, VMM 1130 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Database Dictionary

A database comprises data and a database dictionary that is stored on a persistent memory mechanism, such as a set of hard disks. A database is defined by its own separate database dictionary. A database dictionary may comprise multiple data structures that store database metadata. A database dictionary may for example, comprise multiple files and tables. Portions of the data structures may be cached in main memory of a database server.

A database dictionary comprises metadata that defines database objects contained in a database. In effect, a database dictionary defines much of a database. When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Database Operation

A database dictionary is referred to by a DBMS to determine how to execute database commands submitted to a DBMS. Database commands can access the database objects that are defined by the dictionary. A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   selecting a sample plurality of values from a multiset;
   determining a high-frequency exact count of distinct values that have at least a threshold amount of occurrences in the sample plurality of values;
   determining a low-frequency exact count of distinct values in the sample plurality of values that do not have at least said threshold amount of occurrences in the sample plurality of values;
   calculating, based on a plurality of binomial probabilities, an upper bound of a count of missing distinct values in said multiset that are not in said sample plurality of values;
   estimating a total count of distinct values in the multiset based on:
      said high-frequency exact count of distinct values,
      said low-frequency exact count of distinct values, and
      said upper bound of said count of missing distinct values in said multiset that are not in said sample plurality of values.

2. The method of claim 1 wherein said estimating the total count of distinct values comprises estimating a count of distinct values that, due to sampling error, are not in the sample plurality of values and, without said sampling error, would have at least said threshold amount of occurrences in the sample plurality of values.

3. The method of claim 1 wherein said estimating the total count of distinct values comprises estimating an under-sampled estimated count of the low-frequency exact count of distinct values that, without sampling error, would have at least said threshold amount of occurrences in the sample plurality of values.

4. The method of claim 3 wherein said estimating said under-sampled estimated count of the low-frequency exact count of distinct values comprises estimating said under-sampled estimated count of the low-frequency exact count of distinct values that, without said sampling error, would have at least three occurrences in the sample plurality of values.

5. The method of claim 1 wherein said estimating the total count of distinct values comprises estimating a low-frequency estimated count of distinct values in said multiset that, regardless of sampling error, cannot have at least said threshold amount of occurrences in the sample plurality of values.

6. The method of claim 5 further comprising calculating at least one selected from the group consisting of:
   a lower bound of said low-frequency estimated count of distinct values in said multiset, and
   an upper bound of said low-frequency estimated count of distinct values in said multiset.

7. The method of claim 6 wherein at least one selected from the group consisting of:
   said calculating said lower bound of said low-frequency estimated count of distinct values in said multiset comprises selecting a minimum of multiple estimates, and
   said calculating said upper bound of said low-frequency estimated count of distinct values in said multiset comprises selecting a maximum of multiple estimates.

8. The method of claim 6 wherein said estimating said low-frequency estimated count of distinct values in said multiset is based on at least one selected from the group consisting of:
   said lower bound of said low-frequency estimated count of distinct values in said multiset, and
   said upper bound of said low-frequency estimated count of distinct values in said multiset.

9. The method of claim 6 wherein said estimating said low-frequency estimated count of distinct values in said multiset comprises calculating a geometric mean of:
   said lower bound of said low-frequency estimated count of distinct values in said multiset, and
   said upper bound of said low-frequency estimated count of distinct values in said multiset.

10. The method of claim 1 wherein said selecting the sample plurality of values comprises at least one selected from the group consisting of:
    selecting less than one percent of values in a column of a database table,
    selecting computed values based on original values stored in a database, and selecting values of a compound value comprising at least one selected from the group consisting of:
multiple columns of a same database table, and
columns of multiple database tables.

11. One or more non-transitory computer-readable media storing instructions that, when executed by one or more processors, cause:
selecting a sample plurality of values from a multiset;
determining a high-frequency exact count of distinct values that have at least a threshold amount of occurrences in the sample plurality of values;
determining a low-frequency exact count of distinct values in the sample plurality of values that do not have at least said threshold amount of occurrences in the sample plurality of values;
calculating, based on a plurality of binomial probabilities, an upper bound of a count of missing distinct values in said multiset that are not in said sample plurality of values;
estimating a total count of distinct values in the multiset based on:
said high-frequency exact count of distinct values,
said low-frequency exact count of distinct values, and
said upper bound of said count of missing distinct values in said multiset that are not in said sample plurality of values.

12. The one or more non-transitory computer-readable media of claim 11 wherein said estimating the total count of distinct values comprises estimating a count of distinct values that, due to sampling error, are not in the sample plurality of values and, without said sampling error, would have at least said threshold amount of occurrences in the sample plurality of values.

13. The one or more non-transitory computer-readable media of claim 11 wherein said estimating the total count of distinct values comprises estimating an under-sampled estimated count of the low-frequency exact count of distinct values that, without sampling error, would have at least said threshold amount of occurrences in the sample plurality of values.

14. The one or more non-transitory computer-readable media of claim 13 wherein said estimating said under-sampled estimated count of the low-frequency exact count of distinct values comprises estimating said under-sampled estimated count of the low-frequency exact count of distinct values that, without said sampling error, would have at least three occurrences in the sample plurality of values.

15. The one or more non-transitory computer-readable media of claim 11 wherein said estimating the total count of distinct values comprises estimating a low-frequency estimated count of distinct values in said multiset that, regardless of sampling error, cannot have at least said threshold amount of occurrences in the sample plurality of values.

16. The one or more non-transitory computer-readable media of claim 15 wherein the instructions further cause calculating at least one selected from the group consisting of:
a lower bound of said low-frequency estimated count of distinct values in said multiset, and
an upper bound of said low-frequency estimated count of distinct values in said multiset.

17. The one or more non-transitory computer-readable media of claim 16 wherein at least one selected from the group consisting of:
said calculating said lower bound of said low-frequency estimated count of distinct values in said multiset comprises selecting a minimum of multiple estimates, and
said calculating said upper bound of said low-frequency estimated count of distinct values in said multiset comprises selecting a maximum of multiple estimates.

18. The one or more non-transitory computer-readable media of claim 16 wherein said estimating said low-frequency estimated count of distinct values in said multiset is based on at least one selected from the group consisting of:
said lower bound of said low-frequency estimated count of distinct values in said multiset, and
said upper bound of said low-frequency estimated count of distinct values in said multiset.

19. The one or more non-transitory computer-readable media of claim 16 wherein said estimating said low-frequency estimated count of distinct values in said multiset comprises calculating a geometric mean of:
said lower bound of said low-frequency estimated count of distinct values in said multiset, and
said upper bound of said low-frequency estimated count of distinct values in said multiset.

20. The one or more non-transitory computer-readable media of claim 11 wherein said selecting the sample plurality of values comprises at least one selected from the group consisting of:
selecting less than one percent of values in a column of a database table,
selecting computed values based on original values stored in a database, and
selecting values of a compound value comprising at least one selected from the group consisting of:
multiple columns of a same database table, and
columns of multiple database tables.

* * * * *

UNITED STATES PATENT AND TRADEMARK OFFICE
CERTIFICATE OF CORRECTION

PATENT NO. : 11,537,594 B2
APPLICATION NO. : 17/168459
DATED : December 27, 2022
INVENTOR(S) : Suratna Budalakoti It is certified that error appears in the above-identified patent and that said Letters Patent is hereby corrected as shown below:

On the Title Page

On page 2, Column 1, under Other Publications, Line 15, delete "Adviosry" and insert -- Advisory --, therefor.

On page 2, Column 2, under Other Publications, Line 35, delete ""Es-timation" and insert -- "Estimation --, therefor.

On page 2, Column 2, under Other Publications, Line 51, delete "perWatt"," and insert -- per Watt", --, therefor.

On page 3, Column 1, under Other Publications, Line 8, delete "7thBiennial" and insert -- 7th Biennial --, therefor.

In the Drawings

On sheet 11 of 11, in FIG. 11, under Reference Numeral 1130, Line 1, delete "( VMM)" and insert -- (VMM) --, therefor.

In the Specification

In Column 9, Line 21, delete "Binom(k,n,p)" and insert -- Binom (k,n,p) --, therefor.

In Column 10, Line 16, after "isolate" insert -- $F_i$, --, therefor.

In Column 10, Line 21, delete "$F_i$," and insert -- $F_i$ --, therefor.

In Column 13, Line 31, delete "m" and insert -- $\hat{m}$ --, therefor.

Signed and Sealed this
Twenty-fourth Day of October, 2023

Katherine Kelly Vidal
*Director of the United States Patent and Trademark Office*

CERTIFICATE OF CORRECTION (continued)
U.S. Pat. No. 11,537,594 B2

In Column 13, Line 33, delete "m" and insert -- $\hat{m}$ --, therefor.

In Column 14, Line 3, after "to" insert -- f'1, --, therefor.

In Column 14, Line 13, after "to" insert -- f'$_1$. --, therefor.

In Column 14, Line 19, delete "$\vec{m}'g$" and insert -- $\vec{m}g$. --, therefor.